No. 785,222. PATENTED MAR. 21, 1905.
E. M. KRAMER.
GRAIN SEPARATOR.
APPLICATION FILED JULY 15, 1904.
2 SHEETS—SHEET 1.
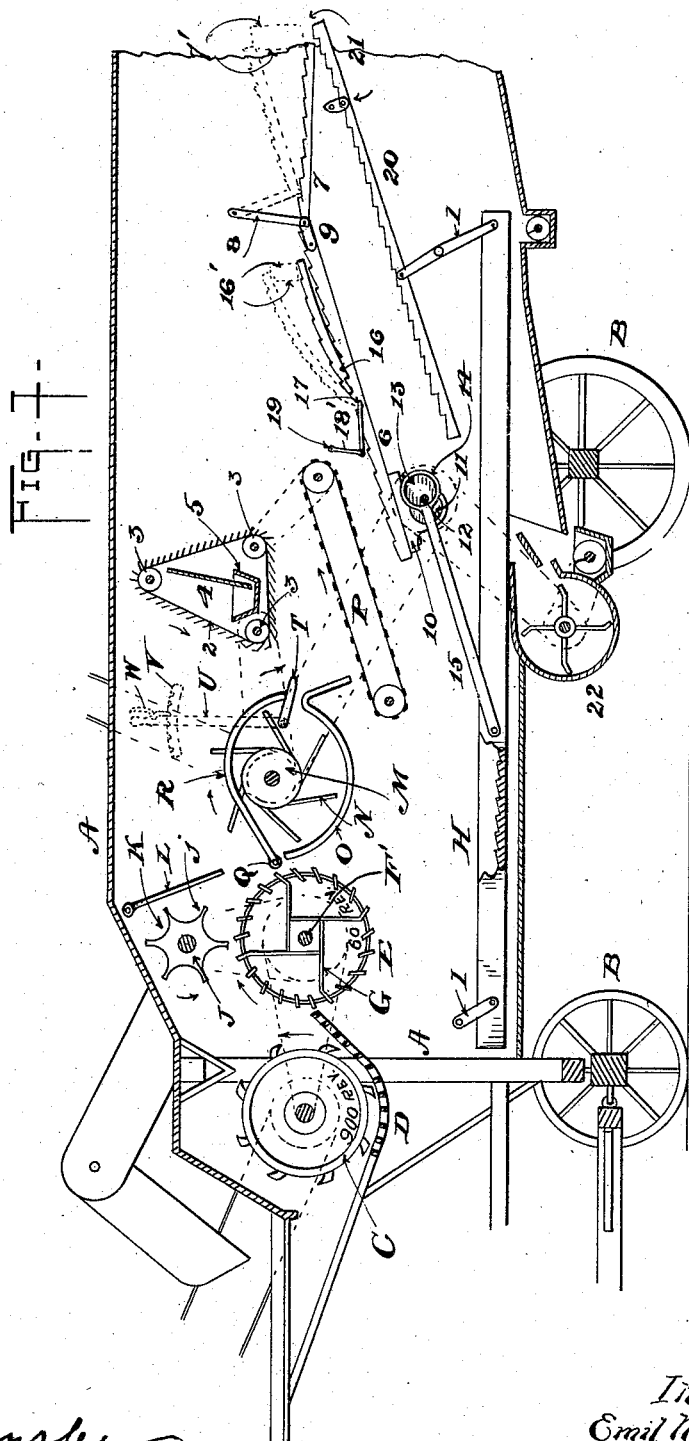
Witnesses
Inventor
Emil M. Kramer
By L. N. Thurlow
Atty.

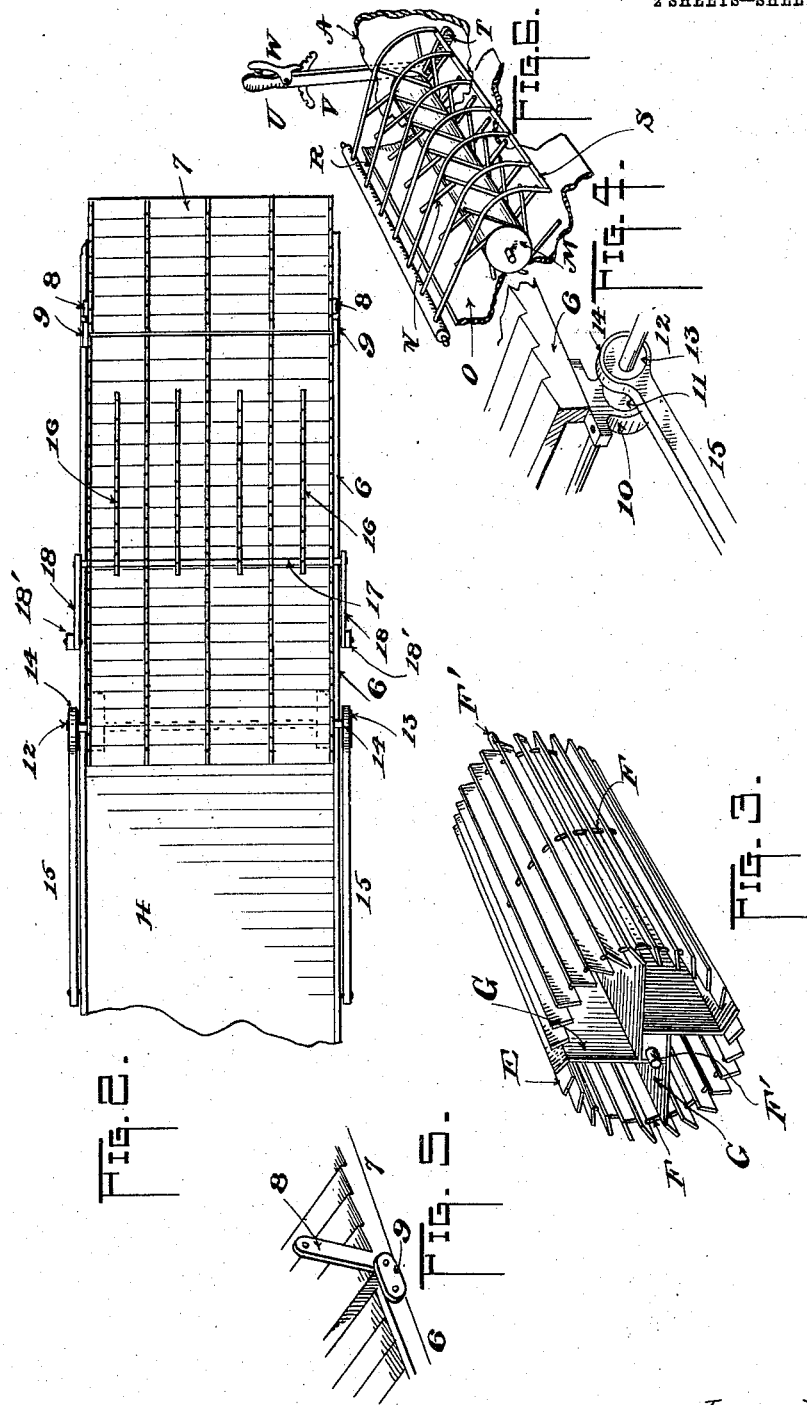

No. 785,222. Patented March 21, 1905.

UNITED STATES PATENT OFFICE.

EMIL M. KRAMER, OF CISSNAPARK, ILLINOIS.

GRAIN-SEPARATOR.

SPECIFICATION forming part of Letters Patent No. 785,222, dated March 21, 1905.

Application filed July 15, 1904. Serial No. 216,640.

*To all whom it may concern:*

Be it known that I, EMIL M. KRAMER, a citizen of the United States, residing at Cissnapark, in the county of Iroquois and State of Illinois, have invented certain new and useful Improvements in Grain-Separators; and I do hereby declare that the following is a full, clear, and exact description of the invention, which will enable others skilled in the art to which it appertains to make and use the same.

This invention pertains to improvements in grain-separators.

The object of the invention is to provide a new means for catching the loose grain thrown from the shelling-cylinder. Another object is to provide an improved straw-shaking mechanism.

A still further object of the present invention is to provide an adjustable guard for one of the beaters of the separator, thereby to permit the said beater to better perform its work.

Lastly, an object of the invention is to generally improve grain-separators by a peculiar disposition of the various beaters and other parts entering into the construction thereof.

In the appended drawings, Figure 1 is a sectional elevation of my improved separator. Fig. 2 is a plan view of a straw-rack. Fig. 3 is a perspective view of a seed retarding and catching cylinder. Fig. 4 is a perspective view of a portion of the straw-rack, showing eccentrics for operating it and a vibrating grain-pan, shown in Fig. 1. Fig. 5 is a perspective view of a portion of the straw-rack, showing means of connecting and hanging the same. Fig. 6 is a perspective view of a beater and adjustable guard therefor.

A indicates the framing of the separator, and B the usual supporting or carrying wheels. C indicate the primary or shelling cylinder at the front end of the machine, beneath which is the ordinary concave D. Directly in the rear of the cylinder and concave or grating is stationed a cylinder for catching grain thrown from the cylinder C. The said grain-catching cylinder is composed of a series of slats E, of metal or wood, connected together by means of metal rings F, which may be passed through the several slats or upon which the slats may be mounted and secured. In the drawings I have shown these rings as passing through the slats; but any other method of securing the slats in place may be used without departing from the spirit and intent of my invention. The cylinder thus formed is carried on a shaft F' by means of wings or flights G, of which there are four, though more than that number or less may be used, as desired. In Figs. 1 and 3 the flights G are shown as part of four of the slats E, the said flights being merely extended to form the slat, as shown. However, this is not important, and other arrangements may be used. I have also shown the slats inclined at an angle to the direction of rotation, so that the flying grain may be more readily caught and deflected within the cylinder; but if the slats are placed straight, so as to radiate from the shaft, the desired aim will be accomplished, and I do not wish to confine myself to what is shown. It will be observed that the flights G, together with the slats, constitute pockets into which the grain must fall when interrupted in its flight by the slats. As shown in Fig. 1, the seed or grain leaving the cylinder C must strike the slats lying at the left of the cylinder, so that it will be deflected downward into the left-hand pocket, where it must remain until the cylinder has made a half-revolution, when it is dropped upon the usual grain-pan H at the bottom of the machine supported or hung from the hangers I.

By the above arrangement the grain that is usually scattered through the separator, much of it finding a resting-place upon the straw and carried through the machine and finally lost on the straw-stack, is caught and deposited upon the grain-pan and saved.

Above the cylinder E G is a beater J of the form shown in Fig. 1, its arms *j* being formed by the grooves or channels K, as shown, and behind said beater is a stop-board L for holding the straw down where it can be properly handled to remove the grain therefrom. Just behind the cylinder E G is a second beater M, having its arms N arranged tangential to the cylindrical body thereof and their free ends pointing away from the direction of rotation of said beater, as shown. Below the beater is a semicircular plate O, designed to catch the small portions of the straw falling through the beater or accidentally carried therethrough and by which those portions are prevented falling to the grain-pan H, being finally carried over to a carrier P to be described presently. Pivoted at Q above the plate O is a vertically-adjustable grating R, comprising a series of bent rods, as shown in Fig. 6, the free ends of which are carried rearward and downward and connected by means of a bar S, the latter resting upon an arm T of a lever U outside the separator in reach of the operator. Said arm T is designed to move with the lever and support the said grating R, there being a notched segmental rack V, with which a spring-latch W engages, by which the lever may be set at any desired point to give the grating R any determined elevation. The purpose of the adjustable grating is that the beater may be made to feed the straw in a rearward direction in greater or less bulk, depending upon the ease with which its grain may be dislodged, since it will be understood that in proportion to the amount of exposure of the arms N above the grating will the straw be carried over upon the canvas P, before mentioned. This latter member consists of the said canvas, having slats P' thereon and carried over rollers P², as in many other older forms of separators. Above the carrier P and behind the beater M is a grain-catcher consisting of a slatted belt 2, passing over rollers 3, arranged in a triangle, within which is a stop-board 4, having below it a grain-pan 5. However, I have not fully illustrated this particular portion of the device, since it has been described at length and shown in drawings of my former patent, No. 762,970, issued to me on the 14th day of June, 1904, and I therefore will not go into detail in this application with respect to this portion of the machine.

Underhanging the canvas carrier P is a straw-rack 6, whose upper end is pivotally carried on a short rack 7, Fig. 5, said latter rack being hung by its arms 8 from the sides of the separator, said rack 6 having its connection through links 9. The lower extremity of the rack 6 has at each side (but one of which is shown) a block 10, within which is an eccentric 11, carried on a shaft 12. Carried on the said shaft outside the eccentric 11 is an eccentric 13, having the eccentric-strap 14 attached to a shaker-rod 15, attached at its free end to the grain-pan H, as shown. A series of serrated arms 16, mounted and carried upon a cross-shaft 17, having bearings in the sides of the rack 6, occupy a position above the said rack 6, and with the said cross-shaft 17 a pair of arms 18 18' are connected at each side of the separator and pivotally hung from the framework of the latter, as at 19.

Beneath the racks 6 and 7 is a shaker-board 20, hung from the sides of the machine by the hangers 21, the hanger I of the pan H being extended upward to have connection with such board 20, as shown. Below the grain-pan H is the usual blower 22 and other parts necessary to a separator, all of which are old and need no especial comment in this specification.

In broken lines at the several cylinders, beaters, and racks that employ revoluble shafts are shown driving-pulleys and connecting-belts; but the exact connection from one pulley to another as I show them is not necessary, since other arrangements equally good or perhaps better may be made. However, with regard to the shaft 12 of the rack 6 it will be seen that revolution thereof will impart movement to the said rack 6 and at the same time to the grain-pan H through the rods 15. Since the arms 18 of the serrated arms 16 above the rack 6 are held at a fixed point and the rack moves in an elliptical orbit, it is evident that the said arms 16 will be given an up-and-down movement combined with a slight backward-and-forward movement, the line of movement of which is represented by the broken lines 16'. Again, the arms 8 of the rack 7 being pivoted at a fixed point said rack must describe the path indicated by broken lines at 7'.

In operation the cylinder C has a revolution of about nine hundred per minute, while the beater J revolves at two hundred and fifty during the same period. The cylinder E G, however, has a revolution of about sixty. The result of these differences of revolution is that the beater J, turning slower than the cylinder C, will only gradually feed the straw backward, thereby retarding the bulk thereof and passing it along in a thin layer, so that every portion thereof is thoroughly beaten to shatter its grain. The revolution of the grain-catching cylinder E G is slow enough to catch flying grain from C, as well as that falling from above by the beating action of J. The revolution of M N is substantially five hundred and fifty, being faster than J, so that the straw not thoroughly beaten before reaching M N is not torn well apart in a thin layer, so that any grain left is about all separated from the straw. By having the rack or grating R above it adjustable the straw may be crowded up against the board L and at the same time exposing less of the length of the arms N and retarding in a great measure the speed of travel of straw through the machine. This is advantageous when the straw is a little damp or where the grain is a little unripe, so that it cannot shatter freely. At such times it is necessary to work the grain more and advance it at a slower rate of speed. Passing from the beater M N the straw reaches the canvas 2, where grain may pass through to the pan 5, the straw being carried down to the carrier P, thence back upon the rack 6, and up over the arms 16, which moving up and down rapidly serve to agitate the straw thoroughly, and from thence the material passes back upon the rack 7, where it is again tossed and turned and at last delivered at the rear of the separator to the straw-stack, the board 20 meanwhile catching stray seed and working it down toward and upon the pan H, where it is cleaned of its chaff, as usual.

I have intimated hereinbefore that changes may be made in various parts of the apparatus and this applied to the entire machine generally, since the exact location of the various elements and their structure is changeable at will. The grain-catching cylinder need not be driven by power necessarily, since the mere passage of the straw thereover beneath the beater J will impart movement to it, and I may therefore drive it positively by the aid of power or may permit it to revolve by passage of straw over it, as I see fit.

I claim—

1. In a grain-separator, the combination with the shelling-cylinder and its concave, of a seed-catching cylinder behind the first, the same adapted to receive the grain and deposit it in quantities to the grain-cleaning mechanism, a beater above the grain-catching cylinder, a second beater behind the grain-catcher, and a vertically-adjustable grating above said second beater and means for adjusting it for the purposes set forth.

2. In a grain-separator, the combination of the shelling-cylinder and its concave, a revoluble beater rearward of the said cylinder and acting with the cylinder to separate the grain, said beater comprising a series of fingers, a vertically-adjustable grating for the beater through which the fingers extend, and means for adjusting the grating to expose more or less of the length of said fingers.

3. In a grain-separator, the combination of the shelling-cylinder and its concave, a revoluble beater located rearward of the cylinder and comprising a series of fingers, a grating above said beater capable of vertical adjustment for exposing more or less length of the fingers, means for adjusting said grating, a revoluble grain-catching cylinder interposed between the shelling-cylinder and the beater consisting of a series of substantially horizontal slats placed tangential to a circle concentric with and smaller than the outer surface circle of said grain-catching cylinder, substantially as shown and described to form a hollow open cylinder, there being a series of pockets within the cylinder for catching the grain entered between the slats from the shelling-cylinder substantially as set forth.

4. In a grain-separator, the combination of the shelling-cylinder and its concave, a beater above and rearward of the said cylinder, a revoluble grain-catching cylinder beneath said beater, the same comprising a series of substantially horizontal slats tangential to a circle concentric with and smaller than the outer surface circle of said grain-catching cylinder, substantially as shown, partitions placed within the cylinder thus constructed substantially parallel with the said axis to form longitudinal pockets for the purposes explained, a beater rearward of the grain-catching member, and a vertically-movable grating through which the teeth of the beater extend, said grating adapted to expose more or less length of the fingers.

5. In a grain-separator, the combination of the shelling-cylinder and its concave, a beater above and rearward of the said cylinder, a revoluble grain-catching cylinder beneath said beater, the same comprising a series of substantially horizontal slats placed tangential to a circle concentric with and smaller than the outer surface circle of said grain-catching cylinder, substantially as shown, partitions placed within the cylinder thus constructed substantially parallel with the said axis to form longitudinal pockets for the purposes explained, a beater rearward of the grain-catching member, a vertically-movable grating through which the teeth of the beater extend, said grating adapted to expose more or less length of the fingers, and means for imparting vertical movement to the grating and sustaining it wherever placed.

6. In a grain-separator the combination of the shelling-cylinder and its concave, a revoluble beater located rearward of the cylinder and comprising a series of fingers, a grating capable of vertical adjustment for exposing more or less length of the fingers, means for adjusting said grating, a revoluble grain-catching cylinder interposed between the shelling-cylinder and the beater consisting of a series of substantially horizontal slats placed tangential to a circle concentric with and smaller than the outer surface circle of said grain-catching cylinder substantially as shown and described and forming a hollow open cylinder, a series of partitions within the cylinder each extending from the vicinity of the axis of the cylinder toward the slats to form grain-receiving pockets, one of the slats constituting the peripheral termination of each said partition.

7. In combination with the threshing-cylinder, concave and beater of a grain-separator, a pair of straw-racks arranged in tandem in substantially the same plane for vibratory movement, a shaft for imparting vibrating movement to the rack nearest the shelling-cylinder and by which the said rack is supported at that end, the second rack having pivotal connection at one end with the opposite end of the first, a pair of arms hung from the sides of the separator and affixed to the said second rack, each movement of the first rack in the direction of the second imparting a vertical vibratory motion to the latter as described, a rock-shaft carried by the first rack across the same, a series of serrated arms rigidly secured to the said rock-shaft, an arm secured at each end of the shaft and extending in an opposite direction from the said serrated arms, and a hanger at each side of the separator and pivoted thereto at one end, the opposite ends of the hangers having pivotal connection with the free ends of the arms on the ends of the rock-shaft as shown and for the purposes described.

In testimony whereof I affix my signature in presence of two witnesses.

EMIL M. KRAMER.

Witnesses:
A. C. AMSLEE,
JOHN F. STEINER.